(12) United States Patent
Lin (10) Patent No.: US 12,368,539 B2
(45) Date of Patent: Jul. 22, 2025

(54) METHODS AND DEVICES FOR TRANSMITTING AND RECEIVING PDSCH

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 431 days.

(21) Appl. No.: 17/981,058

(22) Filed: Nov. 4, 2022

(65) Prior Publication Data

US 2023/0056251 A1  Feb. 23, 2023

Related U.S. Application Data (63) Continuation of application No. PCT/IB2021/053571, filed on Apr. 29, 2021.

(30) Foreign Application Priority Data

May 6, 2020 (WO) .................. PCT/IB2020/000664

(51) Int. Cl.
*H04W 4/00* (2018.01)
*H04L 1/1829* (2023.01)
(Continued)

(52) U.S. Cl.
CPC .......... *H04L 1/1861* (2013.01); *H04L 5/0055* (2013.01); *H04W 72/23* (2023.01); *H04L 1/1812* (2013.01)

(58) Field of Classification Search
CPC ............. H04L 1/18; H04L 5/00; H04W 72/12
See application file for complete search history.

(56) References Cited

U.S. PATENT DOCUMENTS 12,133,263 B2 * 10/2024 Xiong ................. H04W 74/006
2012/0257554 A1 * 10/2012 Kim ...................... H04L 5/0055
370/280
(Continued)

FOREIGN PATENT DOCUMENTS

CA  3056577 A1 * 9/2018 ........... H04L 1/1614
CA  3066995 A1 * 12/2018 ........... H04L 1/1614
(Continued)

OTHER PUBLICATIONS

International Search Report in the international application No. PCT/IB2021/053571, mailed on Oct. 4, 2021.
(Continued)

*Primary Examiner* — Elisabeth Benoit Magloire
(74) *Attorney, Agent, or Firm* — PERKINS COIE LLP (57) ABSTRACT

A method of communications is provided, the methods includes: receiving, by a user equipment (UE), a first transmission from a network; receiving, by the UE, a second transmission from the network. The second transmission starts before a third transmission, or the second transmission ends before the start of a third transmission. The third transmission is relevant to the first transmission and comprises feedback of the first transmission. A method of communications performed by a network, a UE and a network device are also provided.

19 Claims, 8 Drawing Sheets

(51) Int. Cl.
*H04L 5/00* (2006.01)
*H04W 72/23* (2023.01)
*H04L 1/1812* (2023.01)

(56) References Cited

U.S. PATENT DOCUMENTS

| | | | | |
|---|---|---|---|---|
| 2014/0219255 | A1* | 8/2014 | Eyuboglu | H04L 1/0036 |
| | | | | 370/336 |
| 2015/0264708 | A1* | 9/2015 | Li | H04L 1/1887 |
| | | | | 370/329 |
| 2015/0327275 | A1* | 11/2015 | Kwon | H04L 5/001 |
| | | | | 370/236 |
| 2015/0365965 | A1* | 12/2015 | Wu | H04L 1/1854 |
| | | | | 370/328 |
| 2016/0174246 | A1* | 6/2016 | Uchino | H04W 72/23 |
| | | | | 370/326 |
| 2017/0195102 | A1* | 7/2017 | Xiong | H04L 1/18 |
| 2017/0310447 | A1* | 10/2017 | Kusashima | H04L 1/1861 |
| 2018/0092073 | A1 | 3/2018 | Nogami et al. | |
| 2019/0045533 | A1* | 2/2019 | Chatterjee | H04W 72/23 |
| 2019/0052413 | A1* | 2/2019 | Babaei | H04L 1/1854 |
| 2019/0052416 | A1* | 2/2019 | Babaei | H04L 1/188 |
| 2019/0223204 | A1 | 7/2019 | Kim et al. | |
| 2020/0127796 | A1* | 4/2020 | Li | H04L 1/1812 |
| 2020/0170034 | A1 | 5/2020 | Kim et al. | |
| 2021/0135791 | A1* | 5/2021 | Wang | H04L 1/0075 |
| 2022/0095337 | A1* | 3/2022 | Wang | H04L 5/0053 |
| 2022/0095350 | A1* | 3/2022 | Lee | H04W 74/0833 |
| 2023/0147173 | A1* | 5/2023 | Matsumura | H04W 72/1273 |
| | | | | 370/329 |

FOREIGN PATENT DOCUMENTS

| | | | | | |
|---|---|---|---|---|---|
| CA | 3165814 | A1 | * | 7/2021 | ........... H04L 1/1628 |
| CN | 113039730 | A | * | 6/2021 | ........... H04L 1/1854 |
| CN | 112492647 | B | * | 8/2022 | ........... H04L 1/1607 |
| EP | 3720029 | A1 | * | 10/2020 | ........... H04L 1/1607 |
| WO | WO-2021159573 | A1 | * | 8/2021 | ............... H04L 5/00 |

OTHER PUBLICATIONS

Written Opinion of the International Search Authority in the international application No. PCT/IB2021/053571, mailed on Oct. 4, 2021.

* cited by examiner

METHODS AND DEVICES FOR TRANSMITTING AND RECEIVING PDSCH

CROSS-REFERENCE TO RELATED APPLICATIONS

This application is a continuation of International Application No. PCT/IB2021/053571 filed on Apr. 29, 2021, which claims priority to International Application No. PCT/IB2020/000664, filed on May 6, 2020. The contents of both applications are hereby incorporated by reference in their entirety.

BACKGROUND

Non-Terrestrial Networks (NTN) (including satellite segments) might form an integral part of 5G connectivity infrastructure. The communication via satellite is an interesting means thanks to its well-known coverage. Satellites refer to spaceborne platform in Low Earth Orbits (LEO), Medium Earth Orbits (MEO), Geostationary Earth Orbit (GEO) or in Highly Elliptical Orbits (HEO). The altitude for a LEO satellite is between 600 and 1500 km. The altitude of a MEO satellite is between 7000 and 20000 km. The altitude of a GEO satellite is more than 35000 km. Beyond satellites, Non-terrestrial networks (NTN) refer to networks, or segments of networks, using an airborne or spaceborne platform for transmission. Airborne vehicles refer to High Altitude Platforms (HAPs) encompassing Unmanned Aircraft Systems (UAS) including tethered UAS, Lighter than Air UAS (LTA) and Heavier than Air (HTA), all operating at altitude; typically between 8 and 50 km, quasi-stationary. At present, a NTN user requirement (UE) or terminal refers a terminal specific to the satellite system. The UE can communicate with an airborne platform or spaceborne platform via radio link. A gateway connects the space/airborne or aerial access network to the core network.

Nowadays, the non-terrestrial communications is a separate technology to 3GPP cellular technology. Coming to 5G era, these two technologies can merge together, i.e. we can imagine to have a 5G terminal that can access to the cellular and satellite network. NTN can be good candidate technology for this purpose. It is to be designed based on 3GPP NR with necessary enhancement. Thus, in future, a NTN UE or terminal may refers to directly the 3GPP UE in case the satellite serves 3GPP UEs.

Latency is time delay over a communication link, often measured as round trip time RTT, which is the length of time it takes for a signal to be sent plus the length of time it takes for an acknowledgement of that signal to be received. Latency in NTN systems is quite obvious due to the very long distances that the signals must travel into space (i.e. extremely high altitude of satellite) and back. It has been observed that in such systems, the ACK/NACK (AN) feedback (from the receiver to the sender) round trip delay is significant. High latency (long RTT) in a NTN system may not be suitable for delay sensitive service.

3GPP specification Release 15 TS 38.214 "NR; Physical layer procedures for data" specifies UE procedure for receiving the physical downlink shared channel (PDSCH), and suggests that the User Equipment (UE) is not expected to receive another PDSCH for a given HARQ process until after the end of the expected transmission of HARQ process.

The HARQ protocol in NR uses multiple parallel stop-and-wait processes Hybrid-ARQ (HARQ). Upon receipt of a transport block, the receiver tries to decode the transport block and informs the transmitter about the outcome of the decoding operation through a single acknowledgment bit indicating whether the decoding was successful or if a retransmission of the transport block is required. Clearly, the receiver must know to which HARQ process a received acknowledgment is associated. In an asynchronous HARQ protocol, an explicit HARQ process number is used to indicate which process is being addressed.

SUMMARY

The present disclosure relates to relates to the field of telecommunications and in particular to a method and device for data transmission in NTN systems.

In a first aspect, the present disclosure provides a method of communications, the method includes: receiving, by a user equipment (UE), a first transmission from a network; receiving, by the UE, a second transmission from the network.

In a second aspect, the disclosure provides a method of communications, the method includes: transmitting, by a network, a first transmission to a user equipment (UE); and transmitting, by the network, a second transmission to the UE.

In a third aspect, the disclosure provides a user equipment (UE), including a memory, a transceiver and a processor, the memory storing a computer program that, when executed by the processor, causes the processor to receive a first transmission from a network through the transceiver, and receive a second transmission from the network through the transceiver.

In a fourth aspect, the disclosure provides a network device, including a memory, a transceiver and a processor, the memory storing a computer program that, when executed by the processor, causes the processor to transmit a first transmission to a user equipment (UE) through the transceiver, and transmit a second transmission to the UE through the transceiver.

BRIEF DESCRIPTION OF THE DRAWINGS

Some embodiments are now described, by way of example only, and with reference to the accompanying drawings, in which.

DETAILED DESCRIPTION

Example embodiments will be described below with reference to functions, engines, block diagrams, flow diagrams, state transition diagrams and/or flowcharts illustrating methods, apparatuses, systems, computer programs, and computer readable mediums according to one or more exemplary embodiments.

Figure 1:
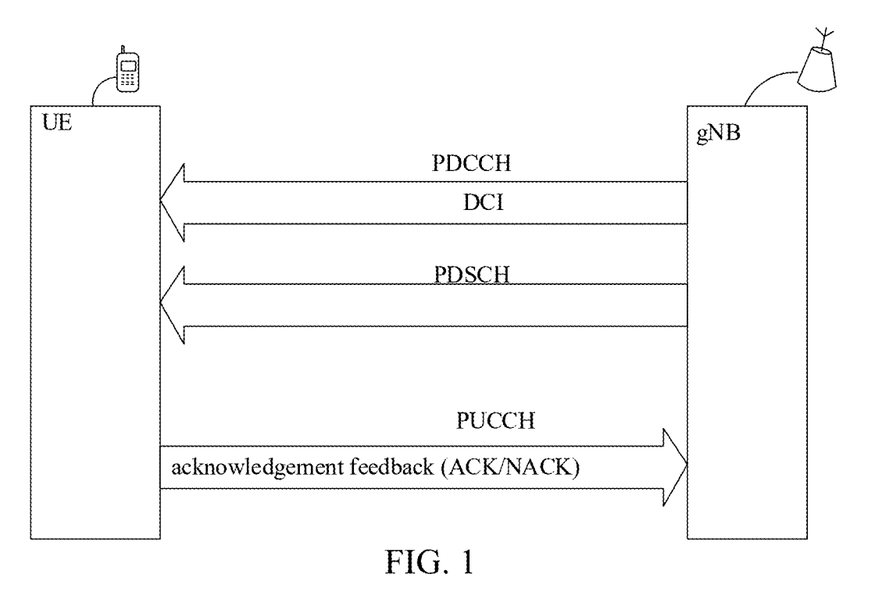
FIG. 1 shows communication between a gNB and a user equipment (UE) in a NR network.

FIG. 1 is a schematic diagram showing components of a communication system including a base station and a user equipment (UE) involved in an HARQ process.

Referring to FIG. 1, in the downlink (from the base station to the UE), a Physical Downlink Shared Channel (PDSCH) transmission is scheduled by a Downlink Control Information (DCI) for the UE, and a Physical Downlink Control Channel (PDCCH) is used for DCI, providing the UE with the necessary information for proper reception and decoding of the downlink data transmission. In the uplink (from the UE to the base station), it is shown that after receiving a downlink data transmission, the UE responds with a HARQ-ACK information, a.k.a, HARQ acknowledgement or HARQ-ACK feedback, to the base station using the Physical Uplink Control Channel (PUCCH).

In this scenario, a base station (sender) will have to wait for the HARQ-ACK feedback from the UE before starts to retransmit a PDSCH (if it is necessary) for the same HARQ process. The UE will not be able to receive a retransmitted PDSCH until the base station has received the HARQ-ACK feedback from the UE for the previous transmission (initial transmission or a retransmission in case there are more than one retransmission needed). Given that the significant RTT delay for transmitting the HARQ-ACK feedback in the NTN systems, the RTT delay in this circumstance becomes undesirable for data transmission between a base station and a UE.

There appears thus a need to improve the situation with respect to this latency problem.

The present disclosure is for example applicable to a telecommunication system such as a 5G (fifth generation) network using the 5G NR (New Radio) as radio access technology (RAT) defined by 3GPP. The present disclosure is applicable to 5G NR (NR in licensed spectrum) but also to 5G NR-U (NR in unlicensed spectrum). The present disclosure is further applicable to Non-terrestrial networks (NTN) systems referring to networks, or segments of networks, using an airborne or spaceborne vehicle for transmission.

The scope of protection sought for various embodiments of the invention is set out by the independent claims. The various embodiments/examples, aspects and features, if any, described in this specification that do not fall under the scope of the independent claims are to be interpreted as examples useful for understanding various embodiments of the invention.

The present invention may find application in radio network with unlicensed spectrum (also referred to as NR-U in the context of the 3GPP standard). More generally, the present invention may find application in any other radio network in which a user equipment measure the quality of a link on the physical layer based on one or more reference signals received from a base station during specific time slots of an evaluation period.

The present invention proposes using blind transmission of PDSCH to a user equipment (UE) to solve the above problem.

Blind transmission, is a transmission made without obtaining an acknowledgement of reception, from the intended receiver (UE).

Figure 2:
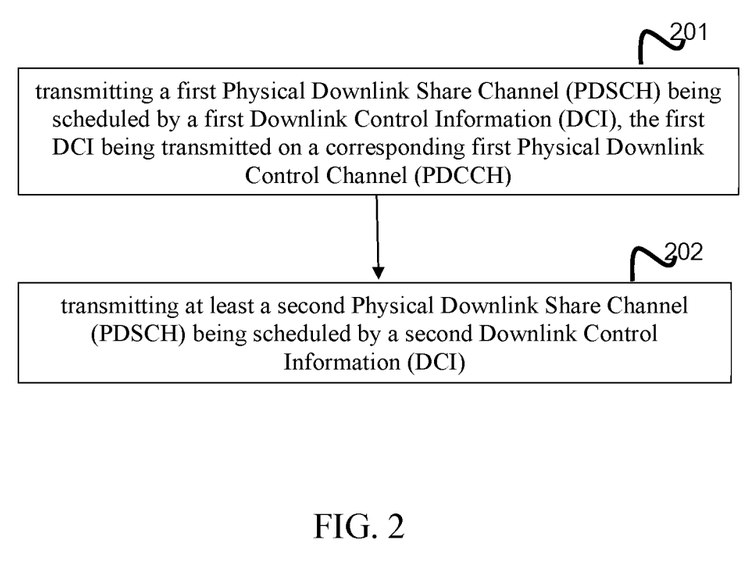
FIG. 2 is a flow chart showing the steps of the method performed by a gNB for transmitting PDSCHs to the UE according to the present disclosure.

FIG. 2 is a flow chart showing the steps of the method performed by a base station for performing a transmission to the UE according to the present disclosure.

In some cases, in step 201, the gNB transmits a first Downlink Control Information (DCI) and a first Physical Downlink Share Channel (PDSCH) that is scheduled by the first DCI to the UE. The first DCI is transmitted on a corresponding first Physical Downlink Control Channel (PDCCH) and comprises a HARQ process number being allocated to the first PDSCH.

In step 202, following the transmission of the first PDSCH the base station transmits a second Physical Downlink Share Channel (PDSCH) and a second Downlink Control Information (DCI) to the UE. The second DCI is transmitted on a corresponding second Physical Downlink Control Channel (PDCCH) and comprises a HARQ process number being allocated to the second PDSCH.

According to some examples, the HARQ process number of the first DCI equals to the HARQ process number of the second DCI. In other words, the first PDSCH and the second PDSCH corresponds to the same HARQ process number.

According some examples, within the same HARQ process, the base station may transmit a second PDSCH subsequent to a first PDSCH without waiting for the acknowledgement feedback transmitted on a first PUCCH from a UE for the first PDSCH ("blind transmission").

Furthermore, the base station may transmit a second PDSCH after the first PDSCH has been decoded by a UE. The minimum time needed for UE to decode a first PDSCH can be either pre-defined or RRC configured.

Figure 3:
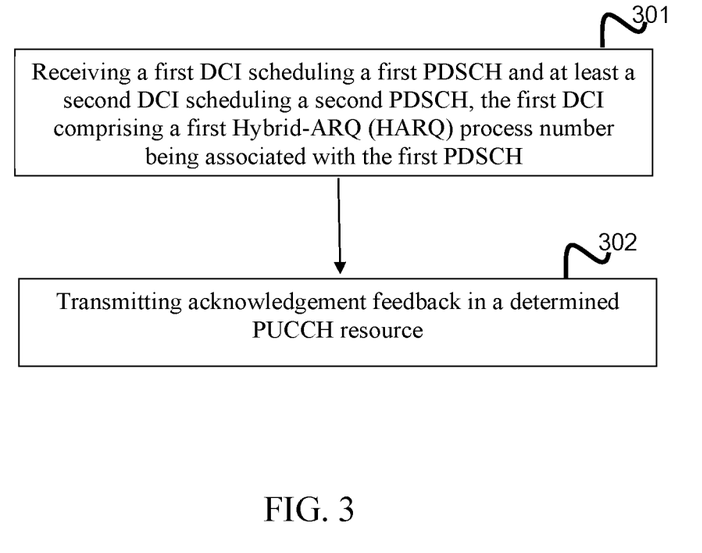
FIG. 3 is a flow chart showing the steps of the method performed by a UE for receiving PDSCHs according to the present disclosure.

FIG. 3 is a flow chart showing the steps of the method performed by a UE for receiving PDSCHs according to the present disclosure.

In step 301, the UE receives a first PDSCH scheduled by a first DCI and at least a second PDSCH scheduled by a second DCI. The first DCI may indicate a first HARQ process number being allocated to the first PDSCH. The first DCI indicates a first PUCCH resource. The first PUCCH resource is used by the UE to transmit the HARQ-ACK information, to the base station, corresponding to the first PDSCH. The second DCI may indicate a second HARQ process number being allocated to the second PDSCH. The second DCI indicates a second PUCCH resource. The second PUCCH resource is used by the UE to transmit the HARQ-ACK information, to the base station, corresponding to the second PDSCH.

Optionally, when the first DCI and the second DCI indicate the same HARQ process number, i.e. the first PDSCH and the second PDSCH correspond to the same HARQ process, the UE can receive the second PDSCH transmission before the UE transmits the first PUCCH transmission. In other words, the first PDSCH and the second PDSCH belong to the same HARQ process. Furthermore, the second PDSCH is received after the first PDSCH and before the first PUCCH transmission. From the UE perspective, the UE is expected to receive another PDSCH for a given HARQ process until after the end of the expected transmission of HARQ-ACK for that HARQ process. Optionally, the start of the PUCCH transmission includes the timing advance, i.e. the PUCCH transmission is transmitted in an uplink frame at the UE side, where the start of the uplink frame is earlier than the start of its corresponding downlink frame at the UE side by a time interval. This time interval is related to the timing advance.

Optionally, the first PDSCH is scheduled by the first DCI and the first DCI does not schedule a corresponding PUCCH resource. As an example, the first DCI contains an indication field PDSCH-to-HARQ_feedback timing indicator, when this field indicates an inapplicable value it means that the corresponding PUCCH resource is not scheduled or the corresponding PUCCH resource does not exist. Thus, if the PUCCH resource is not scheduled by the first DCI, the UE is expected to receive a second PDSCH for a given HARQ process. The second PDSCH is scheduled by the second DCI and the second PDSCH corresponds to the same HARQ process number as the first PDSCH.

According to some examples of the present disclosure, the first DCI is a first New-Data Indicator (NDI) value and the second DCI is a second NDI value. The NDI value is a 1-bit sequence number comprised in the DCI.

Whether the second PDSCH is a retransmission of the first PDSCH depends on the toggled NDI value: if the first NDI value of the first DCI equals to the second NDI value of the second DCI, then the second PDSCH is a retransmission; otherwise, the second PDSCH is a new transmission.

To translate the above paragraph into the language of the 3GPP specifications, it is to say that 'the UE is not expected to receive another PDSCH with NDI toggled for a given HARQ process until after the end of the expected transmission of HARQ-ACK for that HARQ process.

In step 302, the UE transmits acknowledgement feedback in a determined PUCCH resource.

As explained according to the examples of gNB, retransmission of PDSCHs in the same HARQ process of the initial transmission (of the first PDSCH) by a gNB may depend on the first PUCCH resource, rather than the acknowledgement feedback from the UE. This is advantageous for reducing the RTT in the transmission for both gNB and UE: since gNB does not have to wait acknowledgement for retransmission, UE can receive the retransmitted PDSCH with shorter delay.

It is to be noted that the acknowledgement feedback may be ACK or NACK.

Although in the above steps, two PDSCHs and the corresponding scheduling information are mentioned. The second PDSCH is transmitted and received after the first PDSCH in the time order. The present disclosure is not limited to two PDSCHs and may comprise a plurality of PDSCHs.

Note that in the following examples, it is assumed that all PDSCHs such as a first PDSCH ("PDSCH 1"), a second PDSCH ("PDSCH 2") etc. are of the same HARQ process and share the same NDI value. More specifically, the first PDSCH1 refers to an "initial transmission" and the later PDSCHs (for example PDSCH 2) are the retransmissions. In other words, different numbers of the PDSCH starting from 2 except explicitly pointed out, do not refer to new transmissions, but to retransmissions in the same HARQ process.

In NR, the radio frame has a duration of 10 ms and consists of 10 sub-frames with a sub-frame duration of 1 ms. A sub-frame is formed by one or multiple adjacent slots, each having 14 adjacent symbols.

The time between an initial transmission and a retransmission, between the retransmissions are not fixed. Yet, as explained earlier, the time from the reception of each PDSCH to the transmission of ACK or NACK (AN) (on PUCCH) is fixed. The HARQ timing field in the downlink DCI is used to control the transmission timing of the acknowledgment in the uplink. This three-bit field is used as an index into an RRC-configured table providing information on when the HARQ acknowledgment should be transmitted relative to the reception of the PDSCH.

In FIGS. 4-8, horizontal axis represents time, i.e. the respective timing information (DCI on PDCCH, PDSCH and PUCCH timing resource) for a specified transmission or retransmission of PDSCH. For a given downlink assignment, a PDSCH transmission is scheduled by a DCI, and this DCI also indicates the PUCCH resource in which UE is expected to transmit the ACK/NACK (AN) feedback of the scheduled PDSCH. For example, with respect to the first PDSCH, the PDSCH transmission is scheduled by DCI 1 being transmitted in PDCCH 1, this DCI 1 also indicates the PUCCH 1 resource in which the UE is expected to transmit the AN feedback on the PUCCH 1.

It is assumed that in the following embodiments a plurality of PDSCHs have been scheduled to a UE. For example, PDSCH 1 may be an initial transmission and the subsequent PDSCH 2, PDSCH 3 may be retransmissions. It is assumed that in the context of the present invention, the retransmissions are scheduled similarly to the initial transmissions. DCI 1 schedules PDSCH 1 and the corresponding PUCCH 1, DCI 2 schedules PDSCH 2 and the corresponding PUCCH 2 and so on.

First Embodiment

Figure 4:
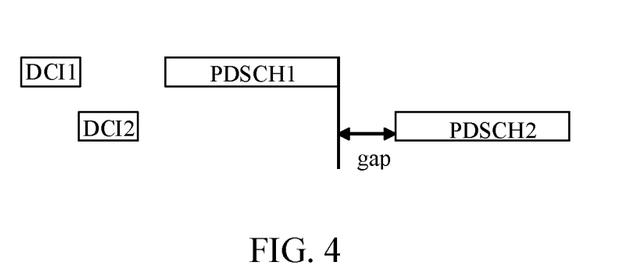
FIG. 4 represents schematically the time sequence of two PDSCHs with respect to a gap time, according to the first embodiment of the invention.

FIG. 4 represents schematically the time sequence of two PDSCHs with respect to a gap time, according to the first embodiment of the invention.

According to the first embodiment, from gNB perspective, when it schedules an initial PDSCH 1, and a retransmission PDSCH 2, the PDSCH 2 is transmitted regardless of the acknowledgement of a destined UE (while timing of the first PUCCH may be considered in the context of the present disclosure). In some examples, the PDSCH 2 is transmitted after a pre-defined gap duration after the last symbol of the first PDSCH, the pre-defined gap duration is the time used for a UE to decode the first PDSCH.

From UE perspective, it expects that the PDSCH 2 starts at least after the pre-defined gap duration after the last symbol of PDSCH 1. The gap is used for UE to decode the PDSCH 1.

In case the PDSCH 1 is correctly decoded, the UE will not need to further decode PDSCH 2 as it is a retransmission. This can save UE power consumption by not having to decode all the received PDSCHs.

In an alternative example although not shown in the figures, the determination of PUCCH resource depends on the AN. Once the UE successfully decodes a PDSCH, it will skip the later PDSCH retransmissions and selects the earliest PUCCH resource that satisfies a timing condition that the first symbol of the earliest PUCCH should not start before T interval after the last symbol of the successfully decoded PDSCH, where T interval is a pre-defined or RRC configured processing time threshold. For example, time T may be calculated by N*S, S is the symbol unit or slot, and N can be an integer or non-integer number, e.g. 2 symbols or 2.5 symbols or 2 slots or 2.5 slots. The interval time T may be the minimum time needed for UE decoding PDSCH.

In this example, the determination of PUCCH depends on the AN acknowledgement feedback. Once the UE successfully decodes a PDSCH (in this example, first PDSCH) indicated by ACK acknowledgement, it will skip the later PDSCH retransmissions, and selects the earliest (in this example, the first) PUCCH that satisfies the timing condition that the first symbol of the second PDSCH should not start before T interval after the last symbol of the successfully decoded PDSCH (in this example first PDSCH). T interval may be a pre-defined or RRC configured processing time threshold. The gap duration can be set as an integer or non integer number of symbols or slots, e.g. 2 symbols or 2 slots or 2.5 symbols or 2.5 slots.

An advantage of this example may be that the complexity of the whole system is reduced due to the sufficient time provided to decode each transmission one after the other, instead of decoding several PDSCH at the same time.

Second Embodiment

Figure 5:
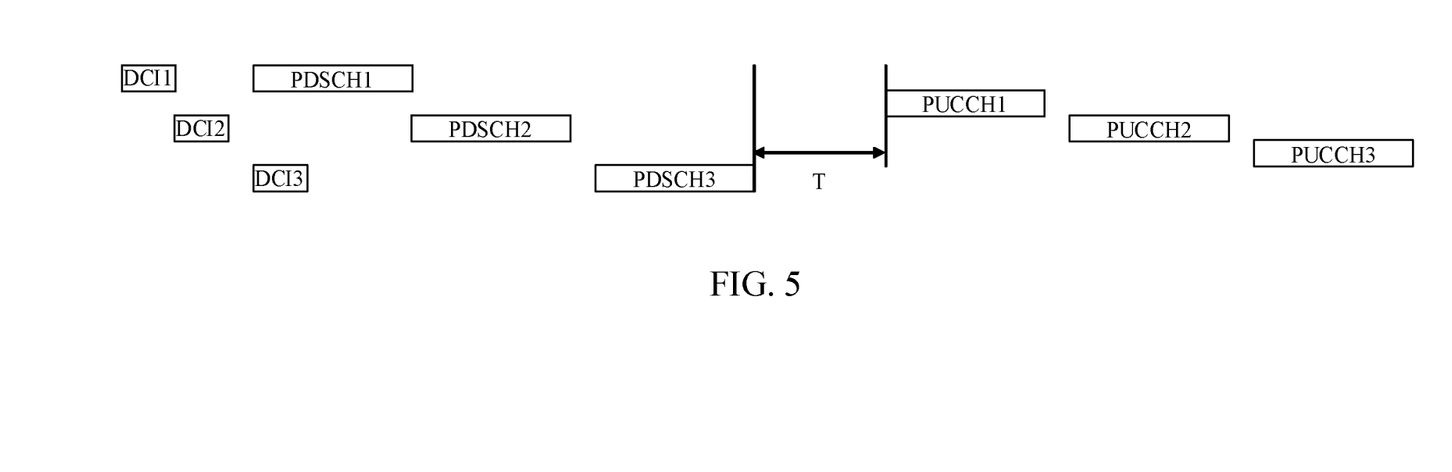
FIG. 5 represents schematically the time sequence of the DCIs and PDSCHs received on the UE and the corresponding PUCCHs with respect to a time period T, according to the second embodiment of the invention.

FIG. 5 represents schematically the time sequence of the DCIs and PDSCHs received on the UE with respect to the corresponding PUCCHs according to the second embodiment of the invention.

According to the second embodiment, if the first PUCCH is not in the same time slot with other PUCCHs, then a PUCCH corresponding to a respective PDSCH will be selected.

In case the PUCCHs are not overlapped and not in the same slot, one possibility is that the AN of each PUSCH is feedback in the respective PUCCH, i.e. AN of PDSCH 1 is transmitted in PUCCH 1, AN of PDSCH 2 is transmitted in PUCCH2, AN of PDSCH 3 is transmitted in PUCCH3.

An advantage of this embodiment is that the UE does not need to use further resources for the selection of PUCCH. However, the drawback is that the AN feedback overhead will be increased and resource be wasted (several PUCCHs are allocated for the feedback of one TB).

Third Embodiment

Figure 6:
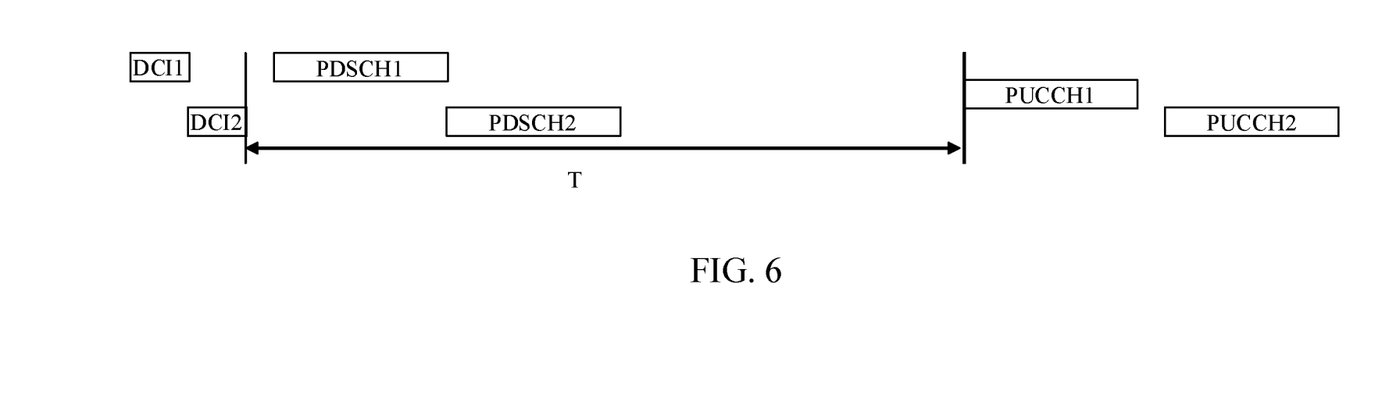
FIG. 6 represents schematically the time sequence of the DCIs and PDSCHs received on the UE and the corresponding PUCCHs as well as a time period T, used for PUCCH resource determination according to the third embodiment of the invention.

FIG. 6 represents schematically the time sequence of the DCIs and PDSCHs received on the UE and the corresponding PUCCHs as well as a time period T, used for PUCCH resource determination according to the third embodiment of the invention;

This embodiment may be considered as an enhancement of the second embodiment in that for any later PDSCH transmission, the allocated PUCCH will override the previous PUCCH allocation. That is PUCCH 2 overrides PUCCH 1 as PDSCH 2 is scheduled later than PDSCH 1. Then PUCCH 3 will override PUCCH 2.

According to the third embodiment, the UE will always select the PUCCH that is indicated by the latest DCI, in this example DCI 2. The UE cancels all the previous PUCCH resource (in this example PUCCH 1) by comparing the gap between the last symbol of PDCCH carrying DCI 2 and the first symbol of PUCCH1 with time T, where T is a pre-defined or RRC configured processing time threshold and if the timing condition is satisfied. For example, time T may be calculated by N*S, S is the symbol unit or slot, and N can be an integer or non-integer number, e.g. 2 symbols or 2.5 symbols or 2 slots or 2.5 slots. In some examples, T may be related to PDCCH decoding and DCI reading.

According to this example, if the gap time equals to or is larger than T, the PUCCH 1 resource is cancelled and UE will only report the AN feedback in PUCCH2. The advantage of this embodiment is that the cancelled PUCCH resource can be used for other purpose, e.g. to be allocated for other UEs.

Although in FIG. 6 the PUCCH 1 resource and PUCCH 2 are shown not overlapped, they might be overlapped and the method is applicable to both situations.

Fourth Embodiment

Figure 7:
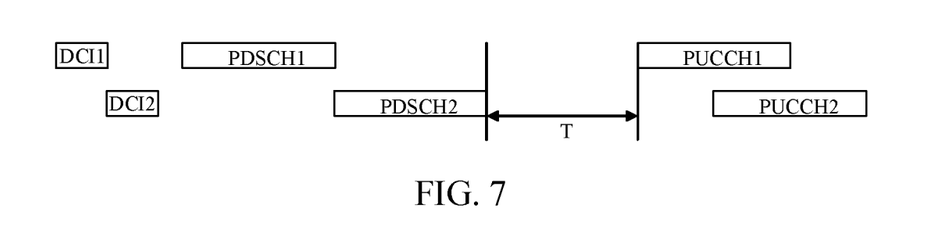
FIG. 7 represents schematically the time sequence of the DCIs and PDSCHs received on the UE with respect to the corresponding PUCCHs with respect to a time period T used for PUCCH resource determination according to the forth embodiment of the invention.

FIG. 7 represents schematically the time sequence of the DCIs and PDSCHs received on the UE and the corresponding PUCCHs with respect to a time period T, used for PUCCH resource determination according to the fourth embodiment of the invention.

As shown in FIG. 7, PUCCH 1 and PUCCH 2 are in the same slot and they are partially overlapped. Overlapping may mean that the two timing resources share at least one common symbol in the time domain. In this example, the UE will determine only one PUCCH for AN feedback and the PUCCH resource may comprise: selecting the earliest PUCCH resource among all overlapped PUCCHS as the reference PUCCH resource, then verifying if the reference PUCCH resource satisfies the timing condition with respect to the last received PDSCH, then selecting the reference PUCCH resource as the PUCCH resource if the timing condition is satisfied. According to some examples, the timing condition is satisfied if the timing between the last symbol of the last received PDSCH and the first symbol of the earliest PUCCH resource is equal to or larger than a pre-defined duration T.

According to the fourth embodiment, DCI 1 schedules PDSCH 1 and the corresponding PUCCH 1 resource is allocated to feedback AN. Later on, DCI 2 schedules a retransmission (PDSCH 2) and the corresponding PUCCH 2 is allocated for AN feedback. As PUCCH 1 and PUCCH 2 are partially overlapped, the UE will only use one PUCCH for AN feedback. The UE first selects the earliest PUCCH, i.e. PUCCH 1, if the PUCCH1 satisfies the following timing condition.

The first symbol of PUCCH 1 should not start before T duration after the last symbol of the latest PDSCH, i.e. PDSCH 2, where T is a pre-defined or RRC configured processing time threshold. For example, time T may be calculated by N*S, S is the symbol unit or slot, and N can be an integer or non-integer number, e.g. 2 symbols or 2.5 symbols or 2 slots or 2.5 slots. When this T threshold is satisfied, the PUCCH1 can be selected to report AN feedback. If PUCCH 1 does not satisfy the condition, UE will continue check if PUCCH2 satisfies the condition.

Alternatively, although not shown in the drawings, PUCCH 1 and PUCCH 2 may be not overlapped or overlapped. In this case, the UE will select PUCCH 2 for AN feedback as it is the latest PUCCH resource.

Fifth Embodiment

Figure 8:
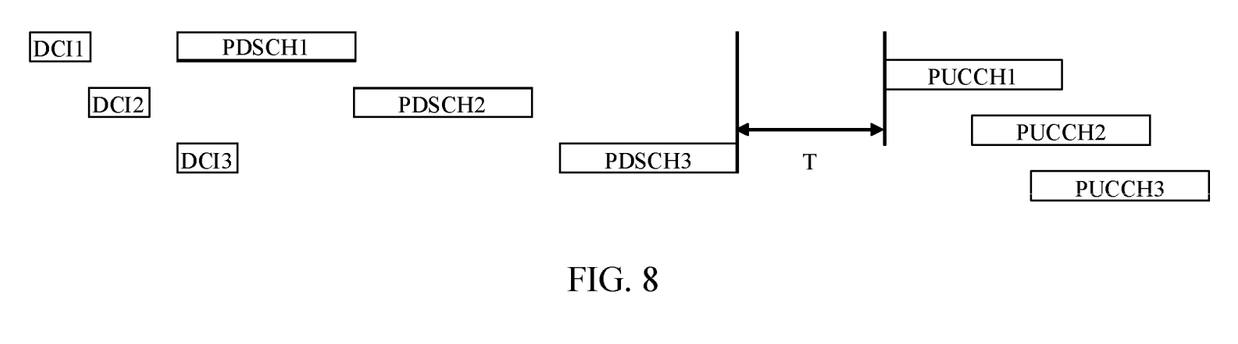
FIG. 8 represents schematically the time sequence of the DCIs and PDSCHs received on the UE with respect to the corresponding PUCCHs with respect to a time period T used for PUCCH resource determination according to the fifth embodiment of the invention.

FIG. 8 represents schematically the time sequence of the DCIs and PDSCHs received on the UE and the corresponding PUCCHs with respect to a time period T, used for PUCCH resource determination according to the fifth embodiment of the invention.

According to this embodiment, in case there are more PUCCH resources are overlapped, the similar method to the fourth embodiment is applied. The UE first selects the earliest PUCCH among all overlapped PUCCHs as a reference PUCCH, then UE checks if this reference PUCCH satisfies the processing time with respect to the latest PDSCH. In this example, time duration T between PDSCH 3 and PUCCH 1 seems shorter than the time duration between PDSCH 2 and PUCCH 1 as shown in FIG. 7. With the reception of more and more PDSCHs, this time duration becomes shorter and shorter until goes below the pre-defined duration. In this case, UE can no longer select PUCCH1 for AN feedback but turns to check PUCCH 2 to allocate resource for acknowledgement, and so on.

The above embodiments dynamically compare the timing between the last symbol of the latest received PDSCH and the first symbol of the earliest PUCCH with a processing time threshold. The selected PUCCH resource is the earliest PUCCH that equals to or is larger than the threshold. This dynamic determination of the PUCCH resource allows to find the earliest PUCCH resource that satisfies the timing condition for further reducing the RTT delay for receiving PDSCHs.

In the above description, the mobile telecommunication system is a 5G mobile network comprising a 5G NR access network. The present example embodiment is applicable to NR in unlicensed spectrum (NR-U) and also to NR in licensed spectrum (NR). The present disclosure can be applied to other mobile networks, in particular to mobile network of any further generation cellular network technology (6G, etc.).

Additional Embodiments

In accordance with aspects of the present disclosure, there are provided a method and device for transmitting and receiving a plurality of PDSCH from the base station to the UE in the same HARQ process.

In accordance with aspects of the present disclosure, the gNB may transmit a plurality of PDSCHs to the UE based on a "blind (re) transmission".

The base station may transmit a second PDSCH subsequent to a first PDSCH without waiting for the acknowledgement feedback transmitted on a first PUCCH from a UE for the first PDSCH ("blind transmission"). The base station may transmit a second PDSCH subsequent to a first PDSCH and before the first PUCCH resource (quasi blind-transmission). Alternatively, the gNB may transmit a second PDSCH subsequent to a first PDSCH before the first PUCCH resource and/or after the first PDSCH has been decoded by a UE.

This has the advantage that the gNB can avoid waiting for the acknowledgement of the UE for each transmission before retransmitting a PDSCH (the timing between a first PDSCH and a first PUCCH resource is usually shorter than the timing between the transmission of the first PDSCH and the reception of the acknowledgement feedback from the UE) and the UE in turn will not have to wait for the retransmission sent by the gNB after gNB's reception of the acknowledgement of the previous transmission. Therefore, the latency delay for the system in particular at the UE side can be greatly reduced.

According to a first aspect of the present disclosure, there is provided a method for communications. The method comprises: receiving, by a UE, a first transmission from a network, and receiving, by the UE, a second transmission from the network.

In some embodiments, the first and the second transmissions are downlink transmissions. In some embodiments, the downlink transmissions comprise at least one of the following: Physical downlink control channel (PDSCH) transmission, Physical downlink shared channel (PDCCH) transmission, or Channel state information-reference signal (CSI-RS) transmission.

In some embodiments, the first transmission corresponds to a first HARQ process number, and the second transmission corresponds to a second HARQ process number.

In some embodiments, the second transmission is the retransmission of the first transmission. In some embodiments, the second transmission starts after the first transmission.

In some embodiments, the first transmission is first PDSCH transmission and the second transmission is a second PDSCH transmission.

In some embodiments, the second transmission starts before a third transmission, the third transmission is relevant to the first transmission.

In some embodiments, the second transmission ends before the start of a third transmission, the third transmission is relevant to the first transmission.

In some embodiments, the third transmission comprises feedback of the first transmission.

In some embodiments, the third transmission comprises a first PUCCH transmission.

In some embodiments, the first PUCCH transmission comprises a first HARQ-ACK information corresponding to the first transmission.

In some embodiments, the first PUCCH transmission comprises a first HARQ-ACK information corresponding to the first HARQ process number.

In some embodiments, the first transmission is scheduled by a first DCI and the first DCI comprises a first indication field.

In some embodiments, the third transmission is scheduled by the first DCI.

In some embodiments, the second transmission is scheduled by a second DCI and the second DCI comprises the first indication field.

In some embodiments, the first indication field in the first DCI indicates the first HARQ process number.

In some embodiments, the first indication field in the second DCI indicates the second HARQ process number.

In some embodiments, the first HARQ process number is equal to the second HARQ process number.

In some embodiments, the first DCI and the second DCI comprise a second indication field.

In some embodiments, the second indication field comprises New data indicator.

In some embodiments, the second indication field in the first DCI and the second indication field in the second DCI indicate the same value.

In some embodiments, the second transmission starts after the first transmission comprising: the second transmission starts at least a first time interval after the end of the first transmission.

In some embodiments, the first time interval comprises a pre-defined time or a Radio Resource Control (RRC)-configured time.

In some embodiments, the first time interval is a number of symbols or slots.

In some embodiments, the third transmission comprises a second HARQ-ACK information, and the second HARQ-ACK information corresponds to the second transmission.

In some embodiments, the third transmission comprises a second HARQ-ACK information, and the second HARQ-ACK information corresponds to the second HARQ process number.

In some embodiments, the third transmission starts at least a second time interval after the end of the second transmission.

In some embodiments, the second time interval comprises a pre-defined time or a Radio Resource Control (RRC)-configured time.

In some embodiments, the second time interval is a number of symbols or slots.

In some embodiments, the second DCI schedules a forth transmission, wherein the forth transmission comprises PUCCH information.

In some embodiments, the forth transmission comprises the second HARQ-ACK information.

In some embodiments, the forth transmission comprises the first HARQ-ACK information.

In some embodiments, the third transmission is not scheduled by the first DCI.

In some embodiments, the first DCI comprises a third indication field and the third indication field indicates a status corresponding to the third transmission is not scheduled.

In some embodiments, the third indication field comprises at least one of the following:

PDSCH-to-HARQ feedback timing indicator; or PUCCH resource indicator.

In some embodiments, the status comprises a pre-defined value or an inapplicable value.

In some embodiments, the third transmission starts at least a third time interval after the end of a fifth transmission.

In some embodiments, the fifth transmission comprises the second DCI.

In some embodiments, the fifth transmission comprises PDCCH transmission.

In some embodiments, the third time interval comprises a pre-defined time or a Radio Resource Control (RRC)-configured time.

In some embodiments, the second DCI does not schedule the forth transmission.

In some embodiments, the second DCI comprises the third indication field that the third indication field indicates the status corresponding to the forth transmission is not scheduled.

In some embodiments, UE performs the third transmission.

In some embodiments, UE performs the forth transmission.

In some embodiments, the network comprises non-terrestrial network (NTN), or a base station in NTN system.

In some embodiments, the base station comprises space-borne platform and/or airborne platform.

According to a second aspect of the present disclosure, there is provided a method for transmitting Physical Downlink Shared Channel (PDSCH) from a base station to a User Equipment (UE), comprising:

transmitting, by the base station, a first physical downlink share channel (PDSCH) being scheduled by a first downlink control information (DCI), the first DCI being transmitted on a corresponding first physical downlink control channel (PDCCH), the first DCI comprising a hybrid-ARQ (HARQ) process number being associated with the first PDSCH, the first DCI indicating a first PUCCH resource;

transmitting, by the base station, at least a second physical downlink share channel (PDSCH) being scheduled by a second downlink control information (DCI), the second DCI being transmitted on a corresponding second physical downlink control channel (PDCCH), the second DCI comprising a HARQ process number being associated with the second PDSCH, the second DCI indicating a second PUCCH resource;

wherein the HARQ process number of the first DCI equals to the HARQ process number of the second DCI, the second PDSCH is transmitted after the first PDSCH.

In one or more examples, the second PDSCH is transmitted before the first PUCCH resource.

In one or more examples, the second PDSCH is transmitted after a pre-defined gap duration after the last symbol of the first PDSCH, the pre-defined gap duration being the time used for a UE to decode the first PDSCH.

According to a third aspect of the present disclosure, there is provided a method for receiving physical downlink shared channel (PDSCH) on a UE, comprising:

receiving, by the UE, a first DCI scheduling a first PDSCH and at least a second DCI scheduling a second PDSCH, the first DCI comprising a first Hybrid-ARQ (HARQ) process number being associated with the first PDSCH, the first DCI indicating a first PUCCH resource, the second DCI comprising a second Hybrid-ARQ (HARQ) process number being associated with the second PDSCH, the second DCI indicating a second PUCCH resource;

transmitting, by the UE, acknowledgement feedback in a determined PUCCH resource;

wherein the HARQ process number of the first DCI equals to the HARQ process number of the second DCI, the second PDSCH is received after the first PDSCH and before the first PUCCH resource.

Since transmissions and retransmissions are scheduled using the same framework in general, the UE (receiver) needs to know whether the transmission is a new transmission, or a retransmission.

Furthermore, the present invention proposes a method and device to determine by the UE, on reception of at least a second PDSCH after a first PDSCH, whether the second PDSCH is retransmission. To this end, an explicit new-data indicator (NDI) is taken into consideration as part of the scheduling information transmitted in the downlink to determine whether the PDSCH is a retransmission or a new transmission. Toggling the new-data indicator (1-bit sequence number) requests transmission of a new transport block, otherwise the previous transport block for the HARQ process should be retransmitted. In other words, if the NDI value of the second PDSCH is the same as that of the first PDSCH, it is a retransmission of PDSCH in the same process; if the NDI value changes, then it is a new transmission.

In one or more examples, it is determined prior to transmitting acknowledgement feedback, by the UE, that the second PDSCH is a retransmission of the first PDSCH based on the first DCI and second DCI.

In one or more examples, the first DCI is a first New-Data Indicator (NDI) value and the second DCI is a second NDI value, and it is determined that the second PDSCH is a retransmission of the first PDSCH if the first NDI value of the first DCI equals to the second NDI value of the second DCI.

In one or more examples, the UE transmits an acknowledgement feedback if the time period between two subsequent PDSCHs is equal to or larger than a first time interval.

In one or more examples, the first time interval comprises a pre-defined time or a Radio Resource Control (RRC)-configured time.

In one or more examples, the first time interval is a number of symbols or slots In one or more examples, the determined PUCCH resource is the first PUCCH resource if the first PDSCH is successfully decoded.

In one or more examples, the determined PUCCH resource is the first PUCCH resource if the first symbol of the first PUCCH resource starts at least a second time interval after the last symbol of the second PDSCH.

In one or more examples, the determined PUCCH resource is the first PUCCH resource if the first symbol of the first PUCCH resource starts at least a second time interval after the last symbol of the second PDSCH and if the first PDSCH is not successfully decoded.

In one or more examples, the second time interval is a number of symbols or slots predefined or RRC-configured.

In one or more examples, the determined PUCCH resource is both the first and the second PUCCH resource.

In one or more examples, the ACK/NACK (AN) acknowledgement of the first PDSCH is transmitted in the first PUCCH resource; the AN acknowledgement of the second PDSCH is transmitted in the second PUCCH resource.

In one or more examples, the determined PUCCH resource is the second PUCCH resource.

In one or more examples, the first PUCCH resource is not used for transmitting ACK/NACK (AN) acknowledgement, if the first symbol of the first PUCCH resource starts at least the third time interval after the last symbol of the second PDCCH that carries the second DCI.

In one or more examples, the third time interval is a number of symbols or slots In one or more examples, the first PUCCH resource and the second PUCCH resource are overlapped in time.

According to a forth aspect of the present disclosure, there is provided a device comprising means for performing a method for transmitting Physical Downlink Shared Channel (PDSCH) from a base station to a UE, the method comprising:

transmitting, a first Physical Downlink Share Channel (PDSCH) being scheduled by a first Downlink Control Information (DCI), the first DCI being transmitted on a corresponding first Physical Downlink Control Channel (PDCCH), the first DCI comprising a Hybrid-ARQ (HARQ) process number being associated with the first PDSCH, the first DCI indicating a first PUCCH resource;

transmitting, at least a second Physical Downlink Share Channel (PDSCH) being scheduled by a second Downlink Control Information (DCI), the second DCI being transmitted on a corresponding second Physical Downlink Control Channel (PDCCH), the second DCI comprising a HARQ process number being associated with the second PDSCH, the second DCI indicating a second PUCCH resource;

the HARQ process number of the first DCI equals to the HARQ process number of the second DCI, the second PDSCH is transmitted after the first PDSCH; and the second PDSCH is transmitted before the first PUCCH resource.

In one or more examples, the device comprises a 5g base station (gNB).

According to a fifth aspect of the present disclosure, there is provided a device comprising means for performing a method for receiving Physical Downlink Shared Channel (PDSCH) on a UE, the method comprising:

receiving a first DCI scheduling a first PDSCH and at least a second DCI scheduling a second PDSCH, the first DCI comprising a first hybrid-ARQ (HARQ) process number being associated with the first PDSCH, the first DCI indicating a first PUCCH resource, the second DCI comprising a second hybrid-ARQ (HARQ) process number being associated with the second PDSCH, the second DCI indicating a second PUCCH resource;

transmitting acknowledgement feedback in a determined PUCCH resource;

the HARQ process number of the first DCI equals to the HARQ process number of the second DCI, the second PDSCH is received after the first PDSCH and before the first PUCCH resource;

it is determined prior to transmitting acknowledgement feedback that the second PDSCH is a retransmission of the first PDSCH based on the comparison of the first DCI and the second DCI; and the first DCI is a first New-Data Indicator (NDI) value and the second DCI is a second NDI value, and it is determined that the second PDSCH is a retransmission of the first PDSCH if the first NDI value of the first DCI equals to the second NDI value of the second DCI.

According to a sixth aspect of the present disclosure, there is provided a base station comprising a device according to the fourth aspect.

In one or more examples, the base station is gNB.

According to a seventh aspect of the present disclosure, there is provided a device comprising means for performing a method for receiving Physical Downlink Shared Channel (PDSCH) on a UE, the method comprising:

receiving, a first DCI scheduling a first PDSCH and at least a second DCI scheduling a second PDSCH, the first DCI comprising a first HARQ process number being associated with the first PDSCH, the first DCI indicating a first PUCCH resource, the second DCI comprising a second HARQ process number being associated with the second PDSCH, the second DCI indicating a second PUCCH resource;

transmitting, acknowledgement feedback in a determined PUCCH resource;

the HARQ process number of the first DCI equals to the HARQ process number of the second DCI, the second PDSCH is received after the first PDSCH and before the first PUCCH resource;

it is determined prior to transmitting acknowledgement feedback that the second PDSCH is a retransmission of the first PDSCH based on the comparison of the first DCI and the second DCI; and the first DCI is a first New-Data Indicator (NDI) value and the second DCI is a second NDI value, and it is determined that the second PDSCH is a retransmission of the first PDSCH if the first NDI value of the first DCI equals to the second NDI value of the second DCI.

According to another aspect of the present disclosure, there is provided a user equipment comprising a device according to the sixth aspect.

According to another aspect of the present disclosure, there is provided a computer readable medium comprising program instructions stored thereon for causing a device to perform the steps of the method according to the first and the second aspect. The computer readable medium may be a non-transitory computer readable medium.

A list of acronyms used in this document is provided below

| Acronym | Meaning |
|---------|---------|
| BS | Base-station |
| CORESET | Control Resource Set |
| DCI | Downlink Control Information |
| DMRS | DeModulation Reference Signal |
| $gN_B$ | gNodeB |
| LTE | Long Term Evolution |
| LTE-A | Advanced long term evolution |
| MIB | Master information block |
| NDI | New-data indicator |
| NR | New Radio |
| NR-U | New Radio-unlicensed |
| PBCH | Physical Broadcast Channel |
| PDCCH | Physical Downlink Control Channel |
| PDSCH | Physical Downlink Shared Channel |
| PUCCH | Physical Uplink Control Channel |
| RRC | Radio Resource Control |
| SFI | Slot Format Indication |
| SS | Synchronization signal |
| TB | Transport Block |
| UE | User Equipment |

A person of skill in the art would readily recognize that one or more or all steps of the various methods described herein can be performed by programmed computers.

Herein, some embodiments are also intended to cover program storage devices, e.g., digital data storage media, which are machine or computer readable and encode machine-executable or computer-executable programs of instructions, wherein such instructions are configured to cause the execution of some or all of the steps of said above-described methods by a corresponding apparatus or system. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Embodiments of a computer-readable medium includes, but are not limited to, both computer storage media and communication media including any medium that facilitates transfer of a computer program from one place to another. Specifically, program instructions or computer readable program code to perform embodiments described herein may be stored, temporarily or permanently, in whole or in part, on a non-transitory computer readable medium of a local or remote storage device including one or more storage media.

In addition, a storage medium may be provided that includes stored instructions, which when executed by the processor 1008 performs one or more of the functions, steps or tasks described above for the concerned device.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in cooperation with smaller stations and perhaps also employing a variety of radio technologies for better coverage and enhanced data rates.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors, microcontrollers, . . . ) embedded in physical objects at different locations.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit), or may be implemented as a processor, or a memory, or a transceiver, or any combination thereof.

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

The description and drawings merely illustrate the principles of the invention. It will thus be appreciated that those skilled in the art will be able to devise various arrangements that, although not explicitly described or shown herein, embody the principles of the invention and are included within its spirit and scope.

Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of communications comprising:
receiving, by a user equipment (UE), a first transmission from a network; and
receiving, by the UE, a second transmission from the network,
wherein the first transmission is a first physical downlink shared channel (PDSCH) transmission, the second transmission is a second PDSCH transmission, and the second transmission is a retransmission of the first transmission,
wherein the second transmission starts before a third transmission, or the second transmission ends before the start of a third transmission, and
wherein the third transmission is relevant to the first transmission and comprises feedback of the first transmission.

2. The method according to claim 1, wherein the first transmission corresponds to a first hybrid automatic repeat request (HARQ) process number, and the second transmission corresponds to a second HARQ process number,
the second transmission starts after the first transmission.

3. The method according to claim 2, wherein the third transmission comprises a first physical uplink control channel (PUCCH) transmission, and
wherein at least one of the following applies:
the first PUCCH transmission comprises a first HARQ-acknowledgement (HARQ-ACK) information corresponding to the first transmission; or
a first HARQ-ACK information corresponds to the first HARQ process number.

4. The method according to claim 2, wherein the first transmission is scheduled by a first downlink control information (DCI) and the first DCI comprises a first indication field; the third transmission is scheduled by the first DCI; the second transmission is scheduled by a second DCI and the second DCI comprises a first indication field; the first indication field in the first DCI indicates the first HARQ process number, the first indication field in the second DCI indicates the second HARQ process number, and the first HARQ process number is equal to the second HARQ process number, and
wherein the first DCI and the second DCI comprise a second indication field, the second indication field comprises new data indicator, and the second indication field in the first DCI and the second indication field in the second DCI indicate the same value.

5. The method according to claim 4, wherein the third transmission comprises a second HARQ-ACK information, and
wherein at least one of the following applies:
the second HARQ-ACK information corresponds to the second transmission; or
the second HARQ-ACK information corresponds to the second HARQ process number.

6. The method according to claim 5, wherein the second DCI schedules a fourth transmission, wherein the fourth transmission comprises PUCCH information, and
wherein at least one of the following applies:
the fourth transmission comprises the second HARQ-ACK information; or
the fourth transmission comprises the first HARQ-ACK information.

7. The method of claim 6, wherein the second DCI does not schedule the fourth transmission, and
wherein the second DCI comprises a third indication field and the third indication field indicates the status corresponding to the fourth transmission is not scheduled.

8. The method according to claim 4, wherein the third transmission is not scheduled by the first DCI,
wherein the first DCI comprises a third indication field, the third indication field indicates a status corresponding to the third transmission is not scheduled, and the status comprises a pre-defined value or an inapplicable value, and
wherein the third indication field comprises at least one of the following:
PDSCH-to-HARQ feedback timing indicator; or
PUCCH resource indicator.

9. The method according to claim 4, wherein the third transmission starts at least a third time interval after the end of a fifth transmission, and the third time interval comprises a pre-defined time or an RRC-configured time, and
wherein at least one of the following applies:
the fifth transmission comprises the second DCI; or
the fifth transmission comprises PDCCH transmission.

10. The method according to claim 2, wherein the second transmission starts after the first transmission comprising:
the second transmission starts at least a first time interval after the end of the first transmission, and
wherein at least one of the following applies:
the first time interval comprises a pre-defined time or a radio resource control (RRC)-configured time; or
the first time interval is a number of symbols or slots.

11. The method according to claim 2, wherein the third transmission starts at least a second time interval after the end of the second transmission, and
wherein at least one of the following applies:
the second time interval comprises a pre-defined time or an RRC-configured time; or
the second time interval is a number of symbols or slots.

12. A method of communications comprising:
transmitting, by a network, a first transmission to a user equipment (UE); and
transmitting, by the network, a second transmission to the UE,
wherein the first transmission is a first physical downlink shared channel (PDSCH) transmission, the second transmission is a second PDSCH transmission, and the second transmission is a retransmission of the first transmission, wherein the second transmission starts before a third transmission, or the second transmission ends before the start of a third transmission, and wherein the third transmission is relevant to the first transmission and comprises feedback of the first transmission.

13. The method according to claim 12, wherein the first transmission and the second transmission further comprise at least one of the following:

physical downlink control channel (PDCCH) transmission;

or channel state information-reference signal (CSI-RS) transmission.

14. The method according to claim 12, wherein the network comprises non-terrestrial network (NTN), or a base station in NTN system.

15. A user equipment (UE) comprising a memory, a transceiver and a processor, the memory storing a computer program that, when executed by the processor, causes the processor to:

receive a first transmission from a network through the transceiver; and receive a second transmission from the network through the transceiver, wherein the first transmission is a first physical downlink shared channel (PDSCH) transmission, the second transmission is a second PDSCH transmission, and the second transmission is a retransmission of the first transmission, wherein the second transmission starts before a third transmission, or the second transmission ends before the start of a third transmission, and wherein the third transmission is relevant to the first transmission and comprises feedback of the first transmission.

16. The UE according to claim 15, wherein the UE performs the third transmission.

17. The UE according to claim 15, wherein the UE performs a fourth transmission.

18. A network device comprising a memory, a transceiver and a processor, the memory storing a computer program that, when executed by the processor, causes the processor to:

transmit a first transmission to a user equipment (UE) through the transceiver; and transmit a second transmission to the UE through the transceiver, wherein the first transmission is a first physical downlink shared channel (PDSCH) transmission, the second transmission is a second PDSCH transmission, and the second transmission is a retransmission of the first transmission, wherein the second transmission starts before a third transmission, or the second transmission ends before the start of a third transmission, and wherein the third transmission is relevant to the first transmission and comprises feedback of the first transmission.

19. The network device according to claim 18, wherein the base station comprises at least one of spaceborne platform or airborne platform.

* * * * *